Patented Jan. 26, 1926.

1,570,626

UNITED STATES PATENT OFFICE.

ARTHUR S. ELSENBAST, OF NEW YORK, N. Y., ASSIGNOR, BY MESNE ASSIGNMENTS, TO THE CELITE COMPANY, A CORPORATION OF DELAWARE.

METHOD OF DEHYDRATING LIQUIDS.

No Drawing. Application filed March 14, 1922. Serial No. 543,781.

*To all whom it may concern:*

Be it known that I, ARTHUR S. ELSENBAST, a citizen of the United States, residing at New York, in the county of New York and State of New York, have invented a new and useful Method of Dehydrating Liquids, of which the following is a specification.

This invention relates to the removal of small amounts of water from liquids such as oils, varnishes, or other non-aqueous liquids, and the main object of the invention is to provide for such removal by absorption of the water in a medium which can be separated from the non-aqueous liquid by filtration or otherwise, so that the liquid is dehydrated with little or no heating thereof, thereby effecting economy in the dehydrating operation as well as improving the quality of the product by eliminating detrimental effects of heat. While such liquids are substantially nonaqueous in character and are frequently referred to as a class as nonaqueous liquids, it will be understood that many of them as they occur naturally or as they are produced commercially contain small percentages of water as an impurity in the form of either free water or emulsion. While the amount of water present may be very small, it is frequently very detrimental to the quality of the oil or other liquid and its removal as accomplished by my process is therefore of great advantage.

I have found that effective dehydration of oils and of varnishes containing small amounts of water can be effected by bringing such liquids in contact with dried or substantially dehydrated diatomaceous earth, which retains or absorbs the water content of such liquid and can then be removed, along with the water, from the oil or varnish by filtration, leaving the oil or varnish in substantially or approximately dehydrated condition. By means of such treatment small percentages of water, either in the form of free water or in the form of emulsion, may be rapidly and economically removed or separated from non-aqueous liquids. It will be, of course, understood that in any case small amounts of the non-aqueous or oily liquid being treated will remain on the surfaces of the diatomaceous earth and on the filtering surfaces with which such liquid comes in contact, as is usual in all filtration operations. The amount of oil so retained by the diatomaceous earth is, however, negligible in proportion to the total amount treated, while a very large proportion or substantially all of the water present is absorbed by the diatomaceous earth, thus causing a great reduction in the percentage of water present as an impurity in the oil.

My process may be described as applied to the drying of a varnish containing about one per cent of water. Finely divided diatomaceous earth is dried for example by heating in any suitable drier, at a temperature, say of about 100° to 150° C. for about twenty-four hours, thereby eliminating substantially all of the free water which it ordinarily contains (about 6 per cent). It will, of course be understood that any other suitable means may be employed for drying the diatomaceous earth. For example, in some cases a sufficient drying may be accomplished by heating for a longer time at a temperature below 100° C., and in other cases temperatures considerably in excess of 150° C. may be employed in the treatment of the diatomaceous earth. The dried diatomaceous earth is then cooled in an air tight container or in any other suitable manner and the dried and cooled diatomaceous earth is then added to and mixed with the varnish to be dried, using say about one to five pounds of diatomaceous earth to one hundred pounds of the varnish, and agitating the mixture in a suitable agitator. The liquid is then subjected to filtration in any suitable apparatus, for example, in a filter-press. The filtrate is then substantially or approximately free of water, the water in the varnish having been retained or absorbed by and removed with the diatomaceous earth. A similar procedure may be followed in the dehydration of oils either mineral or vegetable or animal oils or fats. It may be desirable in some cases to warm the liquid during the mixing operation or prior to the filtering operation, to increase the fluidity of the liquid, but in any case the heat applied can be reduced to a minimum, and any injury of the quality of the oil by over-heating may be avoided. This is especially important in the case of vegetable or animal oils, which are liable to deterioration by heating. In the case of such oils, the avoidance of heating in the dehydrating operation or the abstraction of the water at ordinary temperature or with minimum heating, raises the yield and improves the keeping quality of the oil. Elimination or reduction of the heating of the oil or varnish in dehydration thereof also results in a considerable economy in the operation. In some cases the pre-drying of the diatomaceous earth may be omitted, the material being used in the ordinary "commercially dry" condition. The dehydrating agent, namely, diatomaceous earth, acts, in the case of emulsions, as a retaining or straining agent, as well as an absorbing agent, breaking up the emulsion by holding back the water, while permitting the oil or other nonaqueous liquid to pass through the filter. The dehydrating agent may in some cases be brought into contact with the oil or other liquid to be treated in other ways; for example, the liquid may be passed or percolated through a body or bed of the dehydrating agent.

I prefer to carry out the invention by mixing the dry diatomaceous earth with the emulsion or other liquid to be dehydrated, and then passing the mixture through a filter press of either the pressure or vacuum type, as the operation then proceeds most effectively and rapidly. In such operation, the diatomaceous earth accumulates on the cloth or filter medium and forms a water absorbing and retaining bed from which the non-aqueous liquid is separated by the filtration. The amount of dry or dehydrated diatomaceous earth to be used in the dehydration of various nonaqueous liquids depends upon the amount of water to be removed. Since the absorptive properties of the diatomaceous earth also vary slightly with the mesh and microscopic structure as well as effectiveness of the previous drying, the amount of diatomaceous earth to be used should be ascertained by a test of the above variables.

What I claim is:

1. The method of separating water from non-aqueous liquids, which consists in bringing such liquids containing small amounts of water in contact with dried diatomaceous earth and then separating such earth with the water retained thereby, from the said liquids by filtration.

2. The method of separating water from nonaqueous liquids, which consists in mixing substantially dehydrated diatomaceous earth with a non-aqueous liquid containing a small percentage of water and subjecting the mixture to filtration.

3. The process of separating water from nonaqueous liquids which consists in passing such liquids containing small percentages of water through a body of substantially dehydrated diatomaceous earth.

In testimony whereof I have hereunto subscribed my name this 27th day of February, 1922.

ARTHUR S. ELSENBAST.